United States Patent [19]
Toyomura et al.

[11] Patent Number: 6,093,884
[45] Date of Patent: Jul. 25, 2000

[54] SOLAR CELL MODULE, SOLAR CELL ARRAY HAVING THE MODULE, POWER GENERATION APPARATUS USING THE ARRAY, AND INSPECTION METHOD AND CONSTRUCTION METHOD OF THE APPARATUS

[75] Inventors: Fumitaka Toyomura, Kyotanabe; Tatsuo Fujisaki, Nara; Yoshitaka Nagao, Soraku-gun; Shigenori Itoyama, Nara, all of Japan

[73] Assignee: Canon Kabushiki Kaisha, Tokyo, Japan

[21] Appl. No.: 09/186,205

[22] Filed: Nov. 4, 1998

[30] Foreign Application Priority Data

Nov. 6, 1997 [JP] Japan .................................. 9-304231

[51] Int. Cl.⁷ ............................ H01L 31/05; H01L 31/04
[52] U.S. Cl. ................ 136/244; 136/243; 136/245; 136/252; 136/256; 136/290; 136/293; 126/621; 126/622; 126/623; 126/624; 126/627; 52/173.3; 438/66; 438/73; 438/80; 60/641.8
[58] Field of Search .................... 136/244, 243, 136/245, 252, 256, 290, 293; 126/621, 622, 623, 624, 627; 52/173.3; 438/66, 73, 80; 60/641.8

[56] References Cited

U.S. PATENT DOCUMENTS

| | | | |
|---|---|---|---|
| 4,283,106 | 8/1981 | Bunnell | 136/244 |
| 4,310,211 | 1/1982 | Bunnell et al. | 136/244 |
| 4,371,739 | 2/1983 | Lewis et al. | 136/244 |
| 4,460,232 | 7/1984 | Sotolongo | 136/244 |
| 5,110,369 | 5/1992 | Tornstrom et al. | 136/244 |
| 5,409,549 | 4/1995 | Mori | 136/244 |

FOREIGN PATENT DOCUMENTS

| | | |
|---|---|---|
| 5-167095 | 7/1993 | Japan . |
| 7-115218 | 5/1995 | Japan . |

*Primary Examiner*—Alan Diamond
*Attorney, Agent, or Firm*—Fitzpatrick, Cella, Harper & Scinto

[57] ABSTRACT

For facilitating work and improving durability of a grounding conductor without a need for preparation of a separate grounding conductor for grounding a solar cell array, a solar cell array is provided comprising a plurality of solar cell modules each comprising a solar cell element and an electroconductive outer portion, the plurality of solar cell modules being electrically connected by an electric wire, wherein the electric wire has a plurality of cores, at least one of the cores being connected to an electric connection portion for leading a power of the solar cell elements out and at least one of the cores being connected to a grounding portion.

43 Claims, 11 Drawing Sheets

SOLAR CELL MODULE, SOLAR CELL ARRAY HAVING THE MODULE, POWER GENERATION APPARATUS USING THE ARRAY, AND INSPECTION METHOD AND CONSTRUCTION METHOD OF THE APPARATUS

BACKGROUND OF THE INVENTION

1. Field of the Invention

The present invention relates to a solar cell module, a method of producing it, and a solar cell array, a building material, a solar-cell-integrated roof, or a power generation apparatus having a plurality of such solar cell modules connected to each other, and a construction method and a maintenance and inspection method thereof.

2. Related Background Art

When using solar cell modules, durability with respect to the external environment, including temperature, humidity, and impact, is required. Therefore, ordinary solar cell modules are constructed such that: solar cells are sealed with a filler; a weather-resistant film or glass is provided as a protective material on the top surface side thereof; and a reinforcing member or outer member is mounted on the periphery and bottom surface thereof. Most of such members are made of a metal.

From the viewpoint of electrical safety, measures are taken to electrically ground the outer conductor members of solar cell modules. In this way, even if one touches the outer conductor member of a solar cell module, the person does not receive an electrical shock.

Figure 1A:
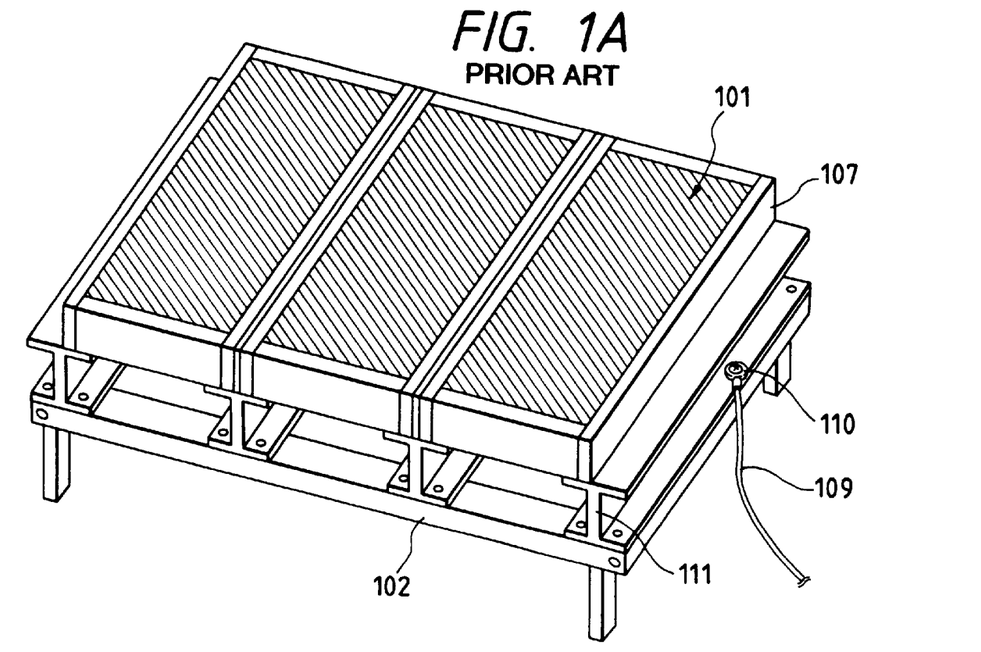
FIG. 1A is a schematic perspective view showing an example of a solar cell array.
Figure 1B:
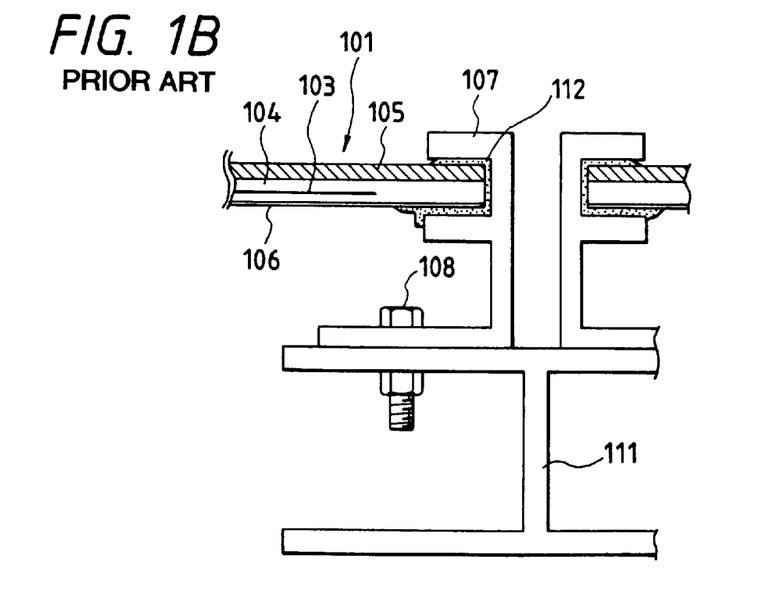
FIG. 1B is a schematic, partial sectional view showing an example of mounting a solar cell module.

FIGS. 1A and 1B are views for explaining an example of a solar cell array using solar cell modules, which are a schematic perspective view and a schematic sectional view thereof, respectively.

In the solar cell array illustrated in FIGS. 1A and 1B, frames 107 of solar cell modules 101 are mounted on mounting members 111 of a stand 102 by fixing means 108 such as bolts. The solar cell devices are attached to the frames 107 with a buffer material 112 being interposed between them. Each of the solar cell modules held by the frames 107 is constructed, for example, in a process wherein a solar cell 103 is sealed with a resin 104 on a glass sheet 105 and a back surface film 106 covers the sealed member, as illustrated in the figure.

In the solar cell array for the photovoltaic power generation apparatus of the stand mounting type as illustrated in FIGS. 1A and 1B, grounding of the apparatus is effected by leading a single-core insulated wire 109 out from a junction 110 at a part of the metal frame 107 or stand 102.

Figure 2:
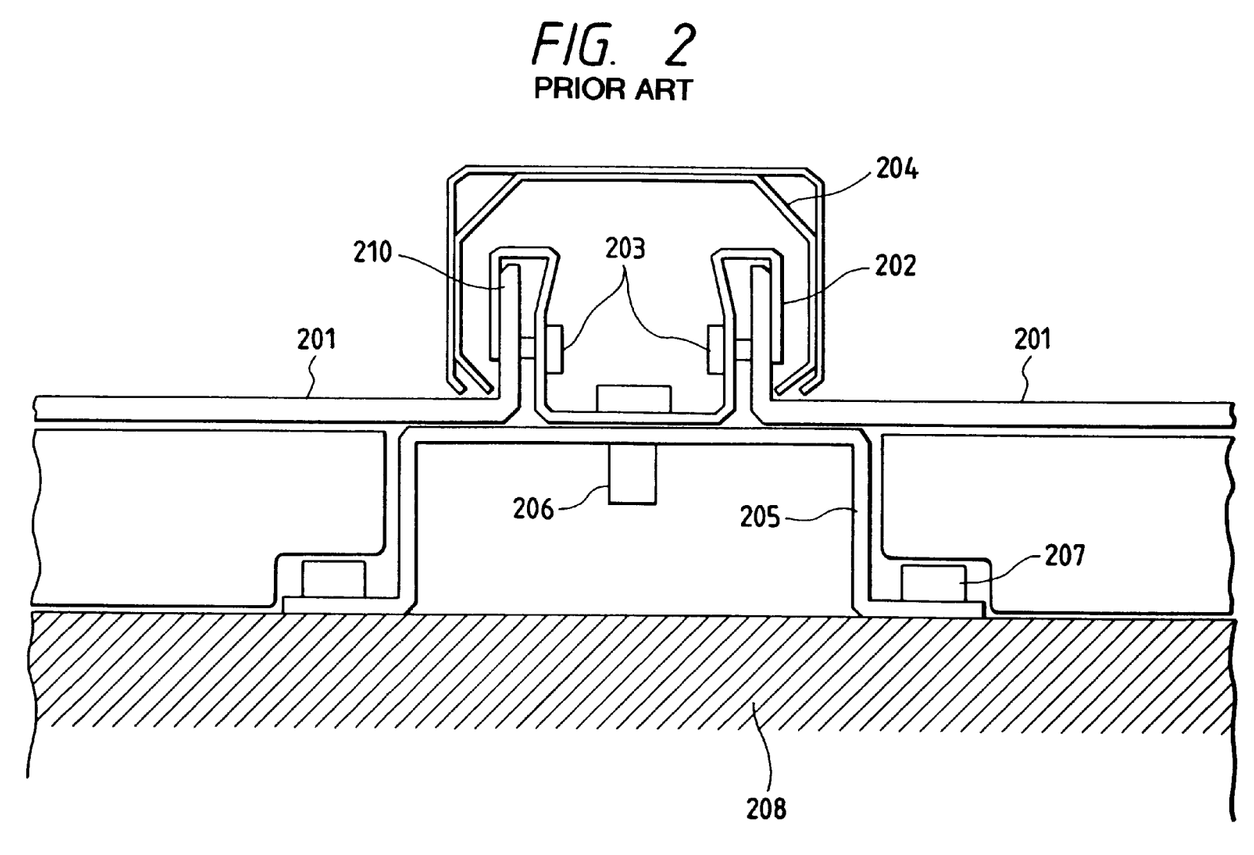
FIG. 2 is a schematic sectional view showing an example of a mounting structure of a solar cell array.

FIG. 2 is a schematic sectional view showing an example of the solar cell array for a photovoltaic power generation apparatus which also functions as a roofing material (simply referred to as roofing material-integrated type photovoltaic power generation apparatus). In FIG. 2, reference numeral 201 designates solar cell modules having solar cells, 202 a clip, 203 screws, 204 a cover, 205 a metal rafter, 206 a tapping screw, 207 a bolt, and 208 a base material.

Further, in the solar cell array for the photovoltaic power generation apparatus of the roofing material-integrated type as illustrated in FIG. 2, it is conceivable to take measures to electrically connect outer conductor portions 210 of the solar cell modules 201 through the clip 202 and screws 203 to the metal rafter 205 and to further ground the metal rafter.

However, the grounding method in the stand mounting type solar cell apparatus as described above was problematic in that the solar cell modules had to be mounted on the stand securely with electrical connection and a grounding conductor had to be prepared separately from distribution lines or the grounded portion of the solar cell modules were exposed and beaten by the weather thereby causing an increase in resistance. Further, in the case of the grounding method in the roofing material-integrated type solar cell apparatus as described above, in addition to the above problems, it was necessary to prepare members different from the normally used roofing parts or specially processed members for grounding, thereby causing lowered operability in construction of the roofing-material-integrated solar cells. Further, in some cases there also arose a problem that it was difficult to carry out measurement in maintenance or inspection of the grounded portion.

SUMMARY OF THE INVENTION

The present invention has been accomplished in view of the above problems, and it is an object of the present invention to provide a solar cell module, a solar cell array, and a power generation apparatus that permit easy and sure execution of grounding.

Another object of the present invention is to provide a solar cell module, a solar cell array, and a power generation apparatus that have good operability and high durability and that can eliminate the need for preparation of a separate grounding conductor.

Still another object of the present invention is to provide a solar cell module, a solar cell array, and a power generation apparatus that permit easy execution of both electrical connection for output and electrical connection for grounding.

Yet another object of the present invention is to provide a construction method of the solar cell module or the solar cell array that can establish a grounding thereof surely and easily.

Yet still another object of the present invention is to provide an inspection method that permits easy inspection at completion of the solar cell array or at maintenance or inspection thereof.

According to a first aspect of the present invention, there is provided a solar cell array and a photovoltaic power generation apparatus having the solar cell array, the solar cell array comprising a plurality of solar cell modules each having a solar cell element and an electroconductive outer portion, the plurality of solar cell modules being electrically connected by an electric wire, wherein the electric wire has a plurality of cores, at least one of the cores being connected to an electric connection portion for leading a power of the solar cell element out and at least one of the cores being connected to a grounding portion of the solar cell module.

According to a second aspect of the present invention, there is provided a solar cell module comprising a solar cell element and an electroconductive outer portion at least in part, wherein an electric connection portion for leading a power of the solar cell element out and a grounding portion of the solar cell module are arranged in the same member, and an array and a photovoltaic power generation apparatus having the module.

According to a third aspect of the present invention, there is provided a method of constructing a photovoltaic power generation apparatus by connecting a plurality of solar cell modules, each comprising a solar cell element and an electroconductive outer portion, through an electric wire having a plurality of cores to compose a solar cell array, and by further connecting the solar cell array to a connection box or an inverter by the electric wire, the method comprising the step of connecting at least one of the cores to an electric connection portion for leading a power of the solar cell elements out and the step of connecting at least one of the cores to a grounding portion of the solar cell module.

According to a fourth aspect of the present invention, there is provided a solar cell module comprising a connector comprising a conduction electrode for establishing conduction with an electrical connection portion and a grounding electrode for connecting to a grounding portion at one end thereof.

According to a fifth aspect of the present invention, there is provided an inspection method comprising measuring a resistance between grounding portions of the both electrodes of a solar cell array during a check at completion of the solar cell array, or during maintenance or inspection thereof.

According to a sixth aspect of the present invention, there is provided a method of producing a solar cell module comprising a solar cell element and an electroconductive outer portion at least in part, comprising the step of arranging a junction box on the outer portion so that the junction box embraces an electric connection portion and a grounding portion.

DETAILED DESCRIPTION OF THE PREFERRED EMBODIMENTS

Figure 3:
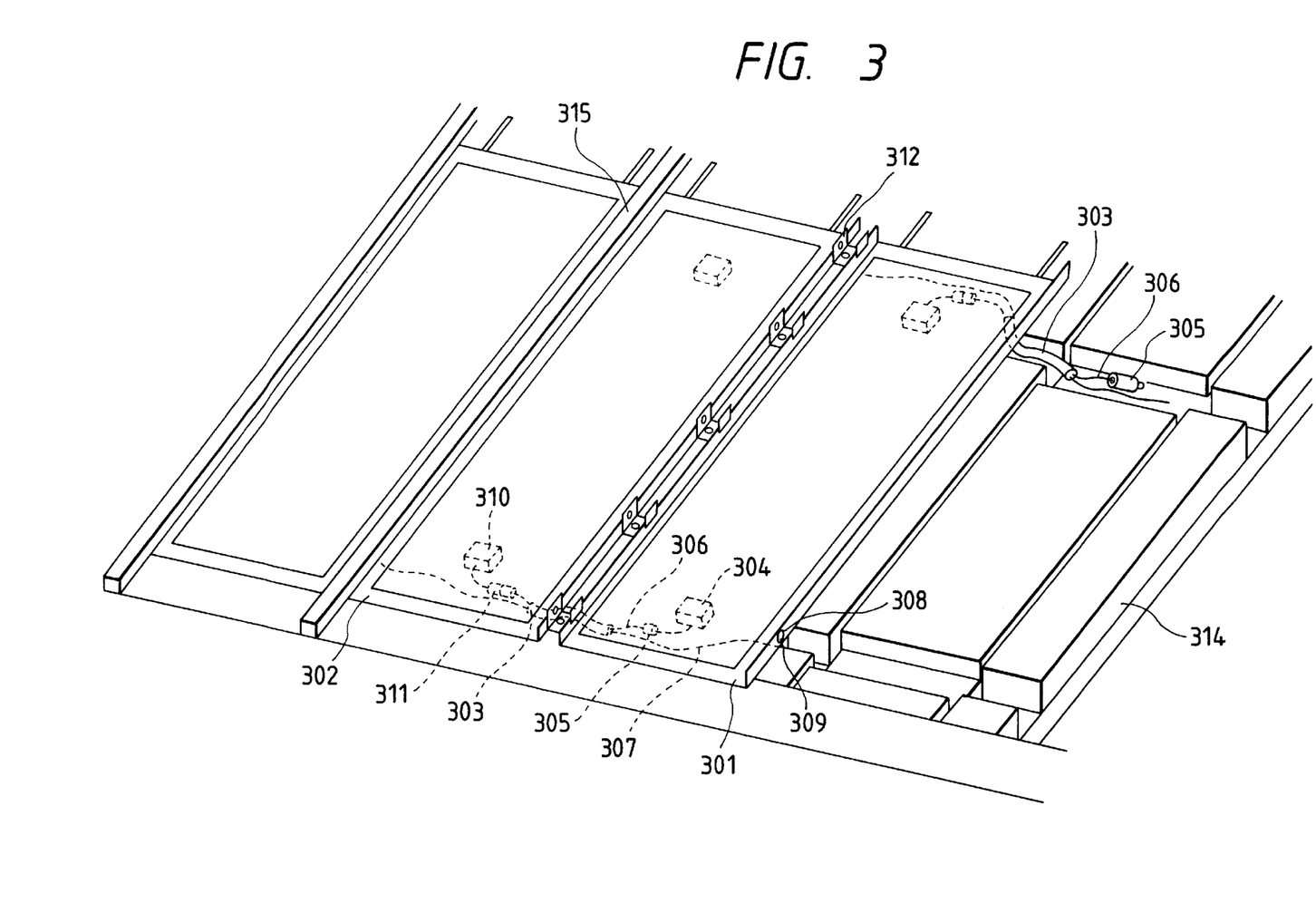
FIG. 3 is a schematic perspective view for explaining an example of a solar cell array installed on a roof.

FIG. 3 shows an example of the solar cell array of the present invention, in which numerals 301, 302 denote solar cell modules having a back surface reinforcing member of an electric conductor portion in the outer portion thereof. One core 306 of an electric wire 303 having a plurality of cores is connected through connectors 305, 311 to each of electric connection portions in junction boxes 304, 310 of the solar cell modules, and another core 307 of the electric wire is fixed and connected by a fixing member 309 such as a bolt and nut, to a grounding portion 308 on the back surface reinforcing member. The solar cell modules 301, 302 are connected to each other by the above-stated electric wire 303, thereby composing the solar cell array. Numeral 315 denotes a cover, which is adapted so as to cover bent portions of respective solar cell modules adjacent to each other with the bent portions inside of the cover. Numeral 312 denotes a clip, and 314 denotes a metal rafter. Further, the solar cell modules can be used as building materials, a plurality of solar cell modules connected can compose a solar cell array or a solar-cell-integrated roof, and a photovoltaic power generation apparatus is constructed by installing an inverter or a connection box for controlling the output. This structure eliminates the need for special members for grounding the solar cell modules, thus considerably improving the operability of installation works including the grounding of the solar cell modules. Particularly, it is more preferable to connect a power line and a grounding line of solar cells to the same connector, because such a structure leads to a decrease in the number of mountings and connections.

The part to which the core for grounding is to be connected is not always limited to the outer portion of the solar cell module 301 as illustrated in the figure, but may be a portion of the solar cell array electrically connected to the outer portion of the solar cell module, a portion of a support member of the solar cell module (roofing material), or on a steel belt and an electroconductive underlayment installed below these members.

In the solar cell module having the back surface reinforcing material being an electrically conductive portion in the outer portion, the grounding portion and an electrical connection portion for leading the power of the solar cell module out may be disposed adjacent each other, and these grounding and electrical connection portions may be set inside the same member stuck to the back surface reinforcing member. This member is normally called a junction box.

Further, the junction box may have a connector portion provided with a conduction electrode (i.e., contact) and a grounding electrode. The conduction electrode and the grounding electrode are connected to the electric connection portion and to the grounding portion, respectively, inside the junction box. Furthermore, it is preferred that an electric wire provided with a connector at an end thereof is drawn out of the stuck member, the electric wire is connected to the electric connection portion and to the grounding portion inside the junction box, respectively, the electric connection portion is electrically connected to the conduction electrode of the connector, and the grounding portion is electrically connected to the grounding electrode of the connector. In addition, it is preferable that the grounding electrode of the connector is connected to a connector provided for an adjacent solar cell module prior to the conduction electrode.

Connecting a plurality of such solar cell modules by an electric wire having plural cores or by connectors can construct a solar cell array or a solar-cell-integrated roof. The grounding portion can be formed by threading or boring the outer portion or by laser welding, resistance welding, or bonding with an electroconductive adhesive onto the outer portion. Further, the grounding portion preferably has a male screw portion or a female screw portion; in the case where the stuck member is a junction box, the inside of the junction box is preferably filled with a filler.

Figure 4:
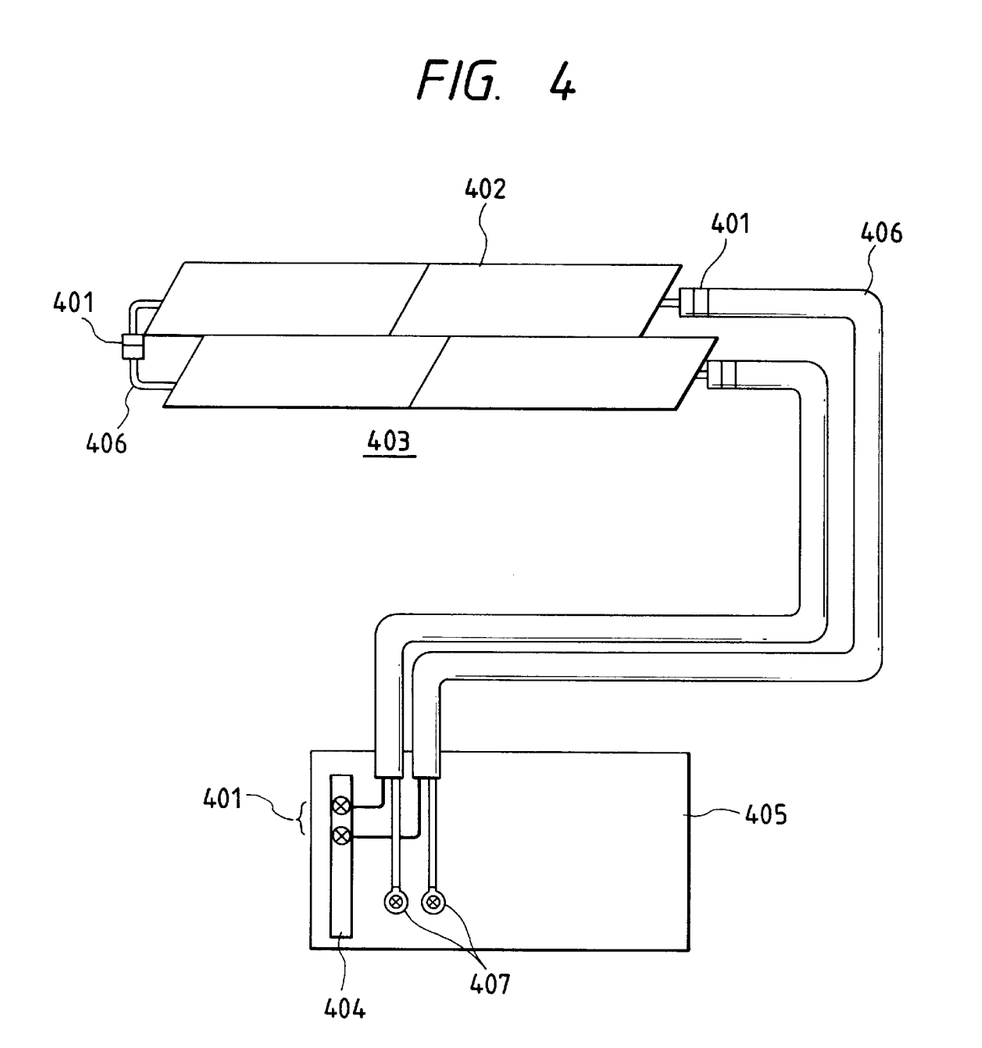
FIG. 4 is a schematic wiring diagram for explaining an example of a maintenance and inspection method.

FIG. 4 is an example of the maintenance and inspection method of the solar cell array in which a plurality of solar cell modules of the present invention are connected. The plurality of solar cell modules 402 are connected by cables 406 having a connector 401 provided with the grounding electrode and the conduction electrode at the end, thereby composing the solar cell array 403. The power line and grounding conductor of the solar cell array 403 are guided to a connection box 405 by the cables 406. Inside the connection box 405, the power line of the solar cell array is connected to power terminals 407 and further connected to an inverter or the like (not shown). Further, the grounding conductor is connected to a grounding terminal 404 to be grounded. For carrying out maintenance and inspection of the grounding conductor, the grounding conductor connected to the grounding terminal 404 is disconnected therefrom, and a resistance is measured between the two terminals 401 to be grounded, whereby the grounding resistance of the solar cell array 403 can be measured readily.

(Solar Cell Module)

There are no specific restrictions on the solar cell modules used in the present invention. However, as the solar cell elements, there can be used silicon semiconductors such as the monocrystalline silicon solar cells, polycrystalline silicon solar cells, amorphous silicon solar cells, etc., or compound semiconductors such as the group III-V compound solar cells, group II-VI compound solar cells, and group I-III-VI compound solar cells.

The solar cell modules used in the present invention are preferably those using the amorphous silicon solar cells. Particularly, by using a weather-resistant film as a surface protecting material of the solar cell modules and using a metal sheet like one used for the metal roof, as a back surface-reinforcing material, building material-integrated or roofing material-integrated solar cell modules can be made. These solar cell modules can be formed, for example, in a folded plate shape, in a batten seam shape, or in a lateral roofing shape. Since the amorphous silicon solar cells can be formed as a thin film on a film substrate or on an electroconductive substrate, the solar cells themselves can be lightweight.

Particularly, the amorphous silicon solar cells using the electroconductive substrate have high structural strength and also have flexibility including bendability, so that they have high degrees of freedom in the shape and can be adapted to various roof shapes and wall shapes.

Further, in the solar cell modules using glass for the surface thereof, an aluminum frame is used as a reinforcing member, and on the occasion of installation of the modules themselves on the structural body such as the roof, an electroconductive support member such as a stand is used between the solar cell modules and the structural body.

(Wire)

Figure 5A:
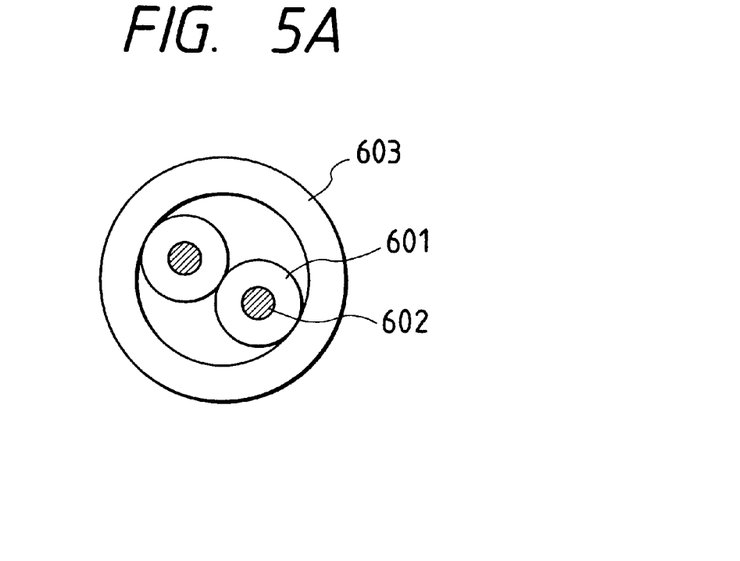
FIGS. 5A, 5B, and 5C are schematic sectional views for explaining preferred examples of electric wires.
Figure 5B:
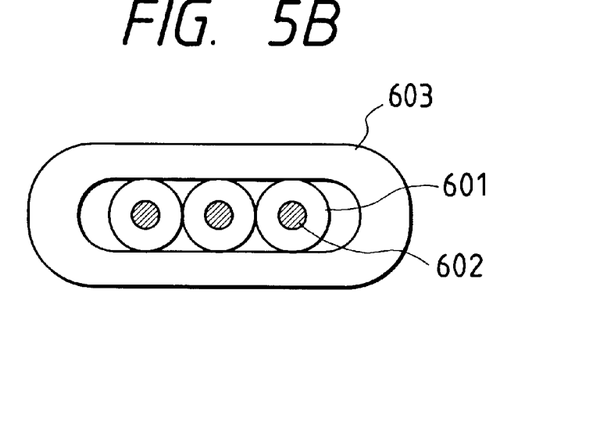
Figure 5C:
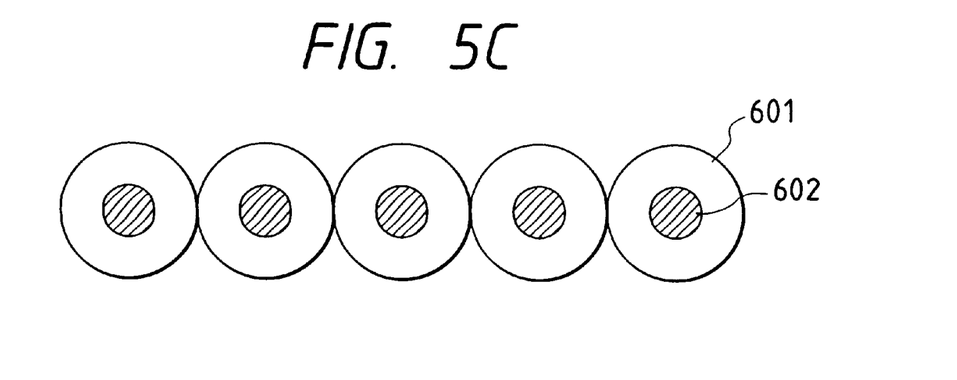

The wire used in the present invention has at least two cores one of which is a core for leading the power of solar cells out and the other of which is a core for grounding the solar cell module. The structure of the wire can be one of the cable structure in which conductors 602 each coated with an insulator 601 are covered by a sheath 603 as illustrated in FIG. 5A, the flat type wire structure (FIG. 5B) in which conductors 602 each coated with an insulator 601 (three cores in the figure) are arranged in parallel and covered by a sheath 603, and the ribbon wire structure (FIG. 5C) in which conductors 602 each coated with an insulator 601 are arranged in parallel and in which adjacent cores are bonded to each other. The wire is selected and used so as to exhibit heat resistance, low temperature resistance, mechanical strength, electrical insulation, water resistance, oil resistance, abrasion resistance, acid resistance, and alkali resistance required according to the use environment.

Specifically, the wire which can be used herein includes 600V polyethylene insulated cables (EV, EE, CV, CE) of JIS C3605 standard, 600V grade ethylene-propylene (EP) rubber insulated cables (PN, PV) of JIS C3621 standard, 600V grade polyvinyl chloride insulated and sheathed (round type, flat type) cables (VVR, VVF) of JIS C3342 standard, class 1, class 2, class 3, or class 4 600V rubber insulated cabtyre cables (1CT, 2CT, 3CT, 4CT) of JIS C3327 standard, class 2, class 3, or class 4 600V rubber insulated chloroprene cabtyre cables (2RNCT, 3RNCT, 4RNCT) of JIS C3327 standard, class 2, class 3, or class 4 600V ethylene-propylene (EP) rubber insulated chloroprene cabtyre cables (2PNCT, 3PNCT, 4PNCT) of JIS C3327 standard, or 600V grade polyvinyl chloride insulated and sheathed vinyl cabtyre cables of JIS C3312 standard.

(Junction Box)

The junction box must exhibit excellent heat resistance, moisture resistance, water resistance, electrical insulation, low temperature resistance, oil resistance, weather resistance, and mechanical strength. A preferred material is one having good adhesion to an adhesive. Taking the above factors into account, the material is preferably a plastic. Considering flame retardancy, the material is preferably a flame-retardant plastic, ceramic, and so on. Examples of plastics include resins or engineering plastics such as polycarbonate, polyamide, polyacetal, modified PPO (modified PPE), polyester, polyarylate, unsaturated polyester, phenolic resin, epoxy resin, polybutylene terephthalate, or nylon. Further, thermoplastic resins such as ABS resin, polypropylene (PP), polyvinyl chloride (PVC), or the like can also be used. In addition, in order to enhance ultraviolet resistance, it is preferred to use carbon black as a pigment or to coat the surface with a resin paint capable of absorbing ultraviolet rays.

(Connector)

There are no specific restrictions on the material for the connector, but, just as the junction box, the material for the connector must exhibit excellent heat resistance, moisture resistance, water resistance, electrical insulation, low temperature resistance, oil resistance, weather resistance, and mechanical strength. As the material, there can be used, for example, polyvinyl chloride, polyethylene resin, polyamide resin, vinylidene fluoride resin, chloroprene rubber, ethylene-propylene rubber, silicone resin, fluororesin, modified PPO (modified PPE), nylon, polycarbonate, polybutylene terephthalate, polypropylene, a copolymer of ethylene-propylene rubber and polypropylene, and so on.

(Outer Portion of Solar Cell Module)

There are no specific restrictions on the outer portion of the solar cell module according to the present invention, but a frame or a back surface-reinforcing material or the like is used in order to function as a reinforcing material for the solar cell module, increase the mechanical strength, and prevent strain or warpage due to a temperature change.

As the material, there can be used for both the frame and back surface-reinforcing material, for example, aluminum, stainless steel, plated steel sheets such as a galvanized sheet iron or a 55% aluminum zinc alloy coated steel sheet, a titanium sheet, a stainless steel sheet, carbon fiber, FRP (glass fiber reinforced plastics), ceramics, glass, Tedlar/Al/Tedlar, polycarbonate, and so on, but the material is not limited to these. The surface of the above materials is preferably coated with a resin such as polyester resin, acrylic resin, or the like as needed.

In the solar cell module of the metal roofing material (metal sheet) integrated type, by bending this metal sheet, i.e., the outer member, together with the resin and outermost surface covering material as bonded, the solar cell module can be handled in the same way as the ordinary metal roofing materials.

(Electric Connection Portion and Grounding Portion)

The electric connection portion of the present invention is a general name of the portions for leading the power of solar cells out, which indicates, for example, a screwing terminal board, a soldering portion, or a plug-in connector portion provided inside the junction box of the solar cell module. Further, the electric connection portion also includes a wire led out of the junction box, a connector with the wire, or an electrode of the connector portion provided on the junction box.

Similarly, the grounding portion is a general name of the portions for grounding the solar cell module and is provided in the outer portion of the solar cell module, the support member of solar cell, the steel belt, or the like. For example, electrical conduction with the solar cell module is established preliminarily by a through hole, a male screw, a female screw, welding, bonding with an electroconductive adhesive, or the like on the through hole in the outer portion, the support member, or the steel belt. Alternatively, the grounding portion can be provided when another fixing member or the like is mounted onto the solar cell module by a drilling screw or the like. The grounding portion is more preferably provided inside the junction box.

EXAMPLES

The present invention will be described in more detail with reference to examples thereof, but it should be noted that the present invention is by no means intended to be limited to the examples.

Example 1

The present example will be described using the solar cell array illustrated in FIG. 3, which was described previously.

FIG. 3 shows an example of the solar cell array in which a plurality of solar cell modules are connected and placed through a space on an underlayment, each solar cell module being formed in such a manner that amorphous silicon solar cells are connected in series and sealed with a weather-resistant resin with a 55% aluminum zinc alloy coated steel sheet provided on the back surface, and each module being bent into the batten-seam roof shape.

First, the roofing material-integrated solar cell module 301 of the batten-seam roof shape is connected to the solar cell module 302 adjacent thereto by the two-core CV cable 303. Specifically, a connector appended to an end of the core 306 of the aforementioned CV cable 303 is connected to the connector 305 led out of the junction box 304 attached to the positive electrode of the solar cell module 301. Further, the other end is connected to a connector 311 led out of the junction box 310 attached to the negative electrode of the adjacent solar cell module 302.

The other core 307 in the CV cable 303 is electrically fixed to a through hole (not shown) bored in a steel sheet of the solar cell module 301 by use of the fixing member 309 having a cross-recessed pan-head machine screw, a hexagon nut, a spring washer, and a plain washer, thus forming a grounding portion 308. Further, the core is also electrically fixed (not shown) by a similar member to a through hole provided in a standing portion of the adjacent solar cell module 302. The solar cell modules 301, 302 are fixed to metal rafters 314 by fixing means such as clips 312.

This work is repeated to connect a plurality of solar cell modules, thereby composing a solar cell array. The solar cell modules can be grounded by a grounding conductor connected to the core 307. Alternately, the metal rafters 314 may be used for a grounding path. The present example permits easy connection of the grounding portion almost at the same time as the electrical connection between the solar cell modules to improve operability and reliability, as compared with the grounding structure using the roof fixing member.

Example 2

Figure 6:
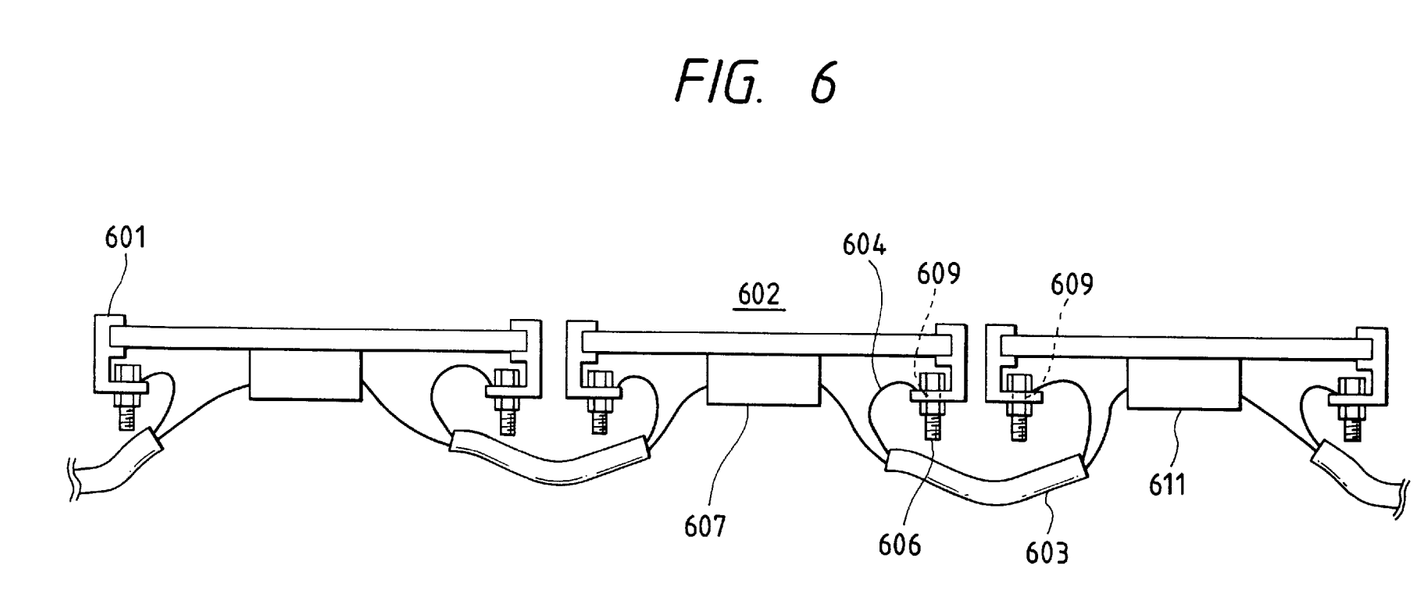
FIG. 6 is a schematic sectional view for explaining an example of electric connection of a solar cell array.

FIG. 6 shows a solar cell array using crystalline solar cell modules 602 in which glass is used for the front surface and a moisture-resistant fluororesin sandwiching an aluminum foil ("Tedlar (mfd. by DuPont)/aluminum foil/Tedlar") is used for the back surface. Further, the crystalline solar cells are sealed with EVA, and an aluminum frame 601 as a reinforcing member is bonded and fixed to the four sides with an adhesive, in place of the solar cell modules using the amorphous silicon solar cells of Example 1. One core of a two-core CV cable 603 is connected to an electricity output portion in the junction box 607 attached to the solar cell module 602, and the other core 604 is electrically fixed to a through hole 609 bored in the aluminum frame 601 by a fixing member 606 comprised of a cross-recessed pan-head machine screw, a hexagon nut, a spring washer, and a plain washer.

Further, the cable 603 is also electrically fixed in the same manner as described above so that one end of the wire to be connected to the electricity output portion in the junction box of the adjacent solar cell module is connected to the electricity output portion inside the junction box 611 attached to the solar cell module 602 and another core to the through hole 609 provided in the aluminum frame 601. This work is repetitively carried out to connect a plurality of solar cell modules, thus composing a solar cell array. The solar cell modules can be grounded by a grounding conductor connected to the core for grounding. The present example permits easy connection of the grounding portion almost at the same time as the electrical connection between the solar cell modules to improve the operability.

Example 3

Figure 7A:
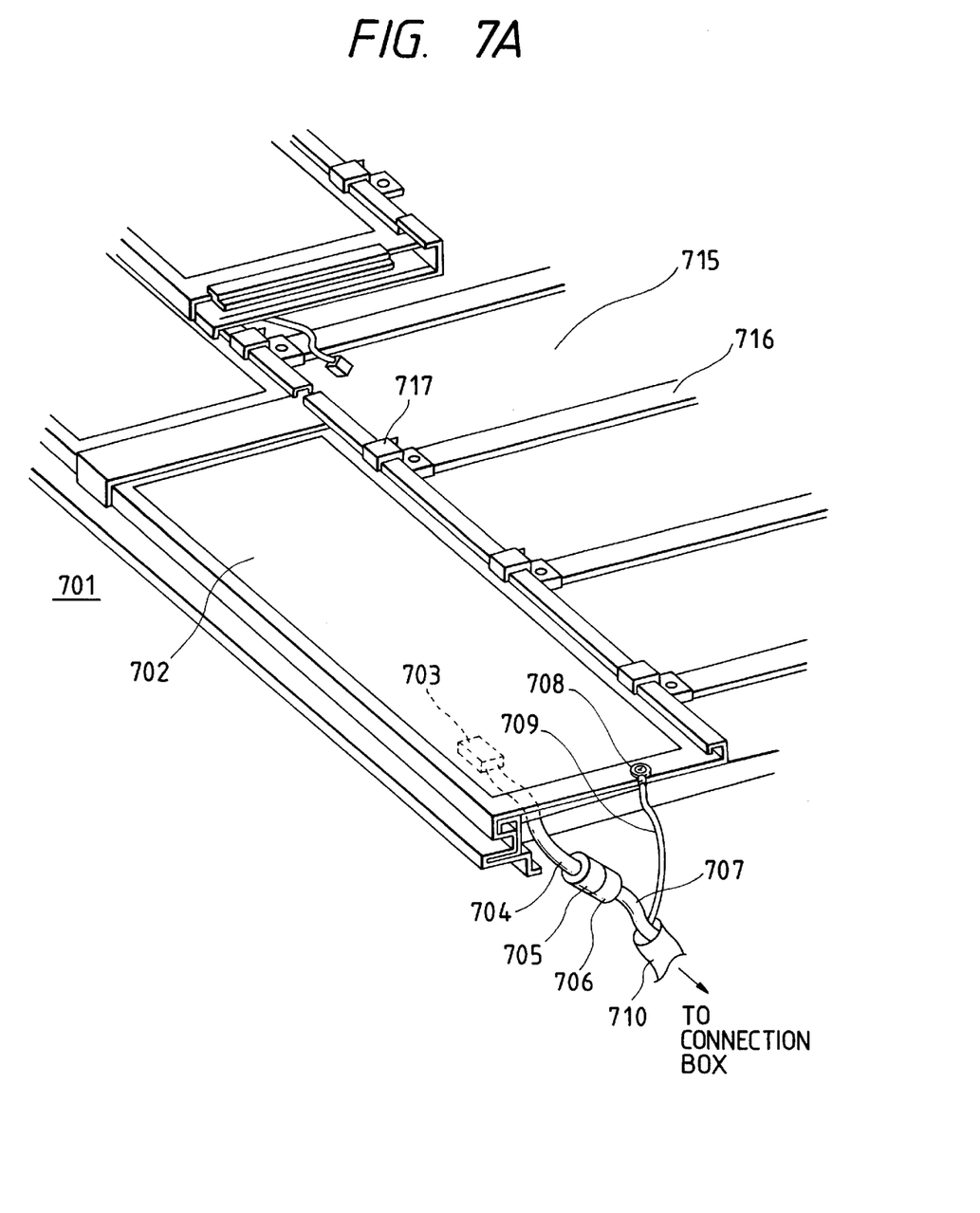
FIG. 7A is a schematic perspective view for explaining an example of a solar cell array installed on a roof.
Figure 7B:
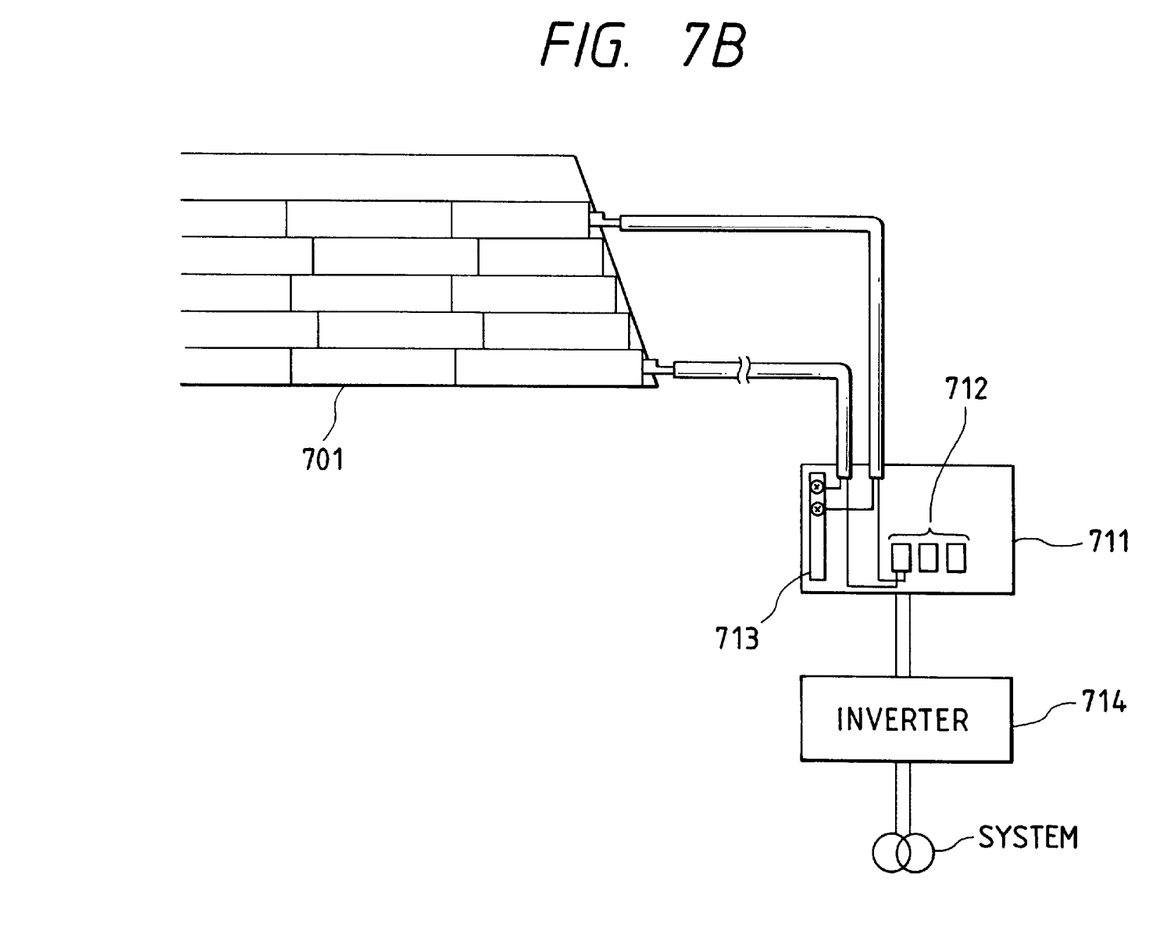
FIG. 7B is a schematic structural view for explaining a preferred example of a photovoltaic power generation apparatus having a solar cell array.

FIGS. 7A and 7B show an example of application of the present invention to laterally roofing solar cell modules using the amorphous silicon solar cells. As illustrated in FIG. 7A, the solar cell modules 702 are mechanically and electrically connected by clips 717 on metal support members 716 on a sheathing roof board 715. A plurality of modules are connected similarly to compose a solar-cell-integrated roof array, and the array is connected through an electric wire to a connection box 711 inside a house and is further connected through an inverter 714 to the system, thereby composing a photovoltaic power generation apparatus. The solar cell module 702 installed at an outermost end of the solar cell modules composing the solar cell array 701 is provided with a connector 705 of polyvinyl chloride resin attached to an end of single-core CV cable 704 which is drawn out of a junction box 703 attached to a positive electrode.

A two-core CV cable 710 has a core 707 equipped with a connector 706 to be engaged with the connector 705 and a core 709 equipped with a crimp-style terminal 708 at the end is prepared, and the cores of the cable 710 are connected each to their counterpart, and the other end of the two-core CV cable is routed into the house to be connected to the electric connection portion 712 and to the grounding terminal portion 713 inside the connection box 711. In this way, plural solar cell arrays are connected to collect current, and the power thereof is linked through the inverter 714 to the system.

The present example permits simultaneous connection to the earth by use of the electric wire for guiding the power of the solar cell array to the connection box, so that a separate grounding conductor does not have to be prepared. This facilitates the work and improves the durability of the grounding conductor.

Example 4

Figure 8A:
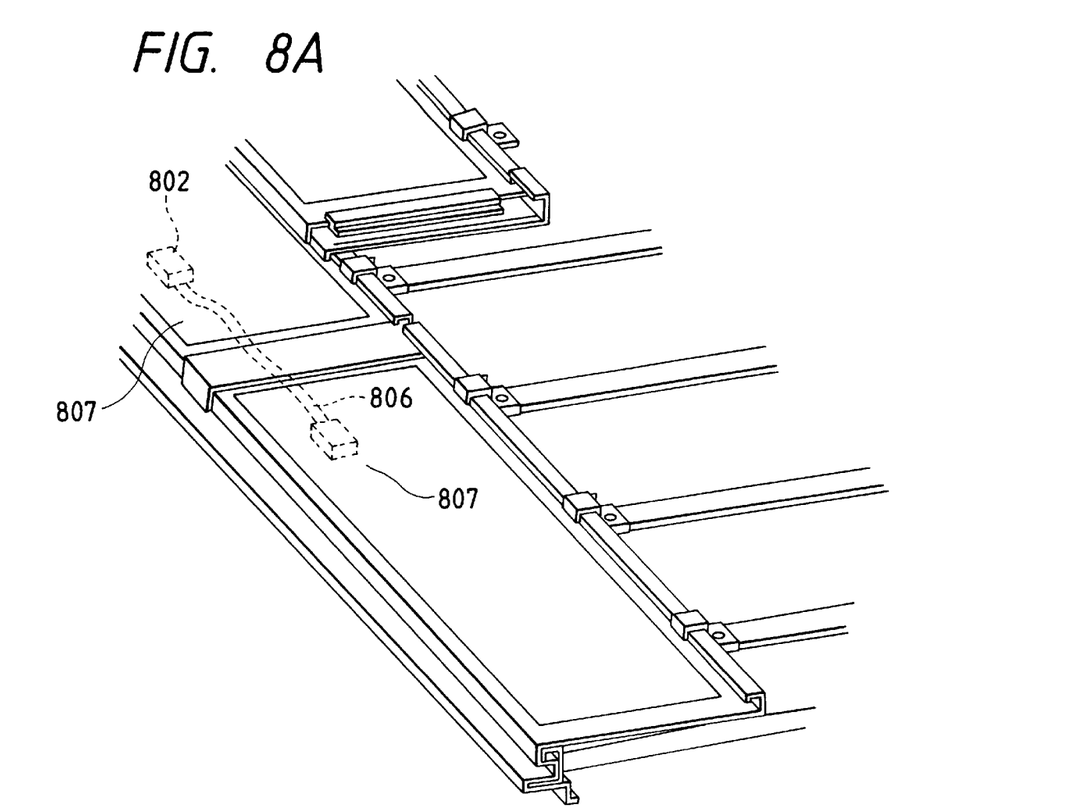
FIG. 8A is a schematic perspective view for explaining an example of a solar cell array installed on a roof.
Figure 8B:
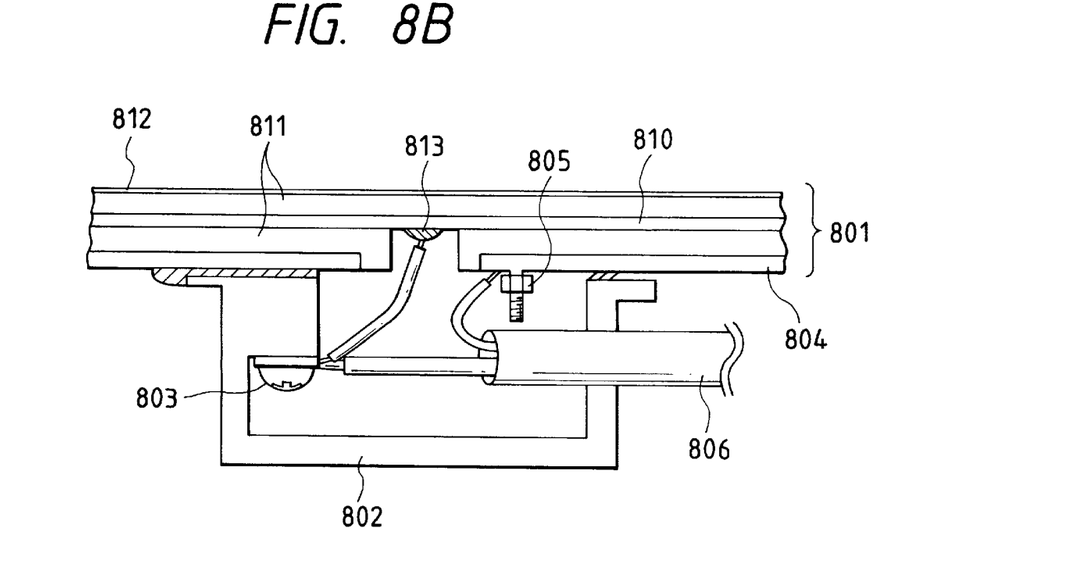
FIG. 8B is a schematic sectional view showing a preferred example of connection relation between a solar cell module and a cable.

FIGS. 8A and 8B are a schematic perspective view and a schematic sectional view of a roof in which a plurality of solar-cell-integrated roof arrays are constructed by mechanically connecting a plurality of laterally roofing solar cell modules using the amorphous silicon solar cells by clips onto support members on a sheathing roof board and electrically connecting the plurality of modules, as is the case with Example 3. Outputs from the roof arrays are connected to the connection box inside the house and linked through the inverter to the system, thereby composing a photovoltaic power generation apparatus. FIG. 8B is a schematic sectional view of a portion near the junction box 802. The solar cell module 801 is constructed in such structure that the solar cell elements 810 are sealed with a filler 811, a surface film 812 is provided in the front surface, and an electroconductive outer portion 804 also serving as a reinforcing plate is provided in the back surface. The electroconductive outer portion 804 and filler 811 are removed at a portion corresponding to an output terminal 813 of the solar cell elements 810, whereby the output terminal 813 may be electrically connected to an electric connection portion 803 provided inside the junction box 802. Further, the junction box 802 also has a grounding portion 805 connected to the electroconductive outer portion 804 inside.

Cores of a two-core CV cable 806 are connected to the electric connection portion 803 and to the electroconductive outer portion 804, respectively, and one end of the cable is connected similarly to adjacent solar cell module 807. This is repetitively carried out to form a solar-cell-integrated roof array. Further, each solar cell array is connected inside the connection box in the same manner as in Example 3. According to the present example, since it is possible to carry out simultaneous connection to the earth by use of the electric wire for guiding the power of the solar cell array to the connection box, a separate grounding conductor does not have to be prepared. This facilitates the work and improves the durability of the grounding conductor. Further, since the grounding portion is located inside the junction box, the durability is further improved.

Example 5

Figure 9:
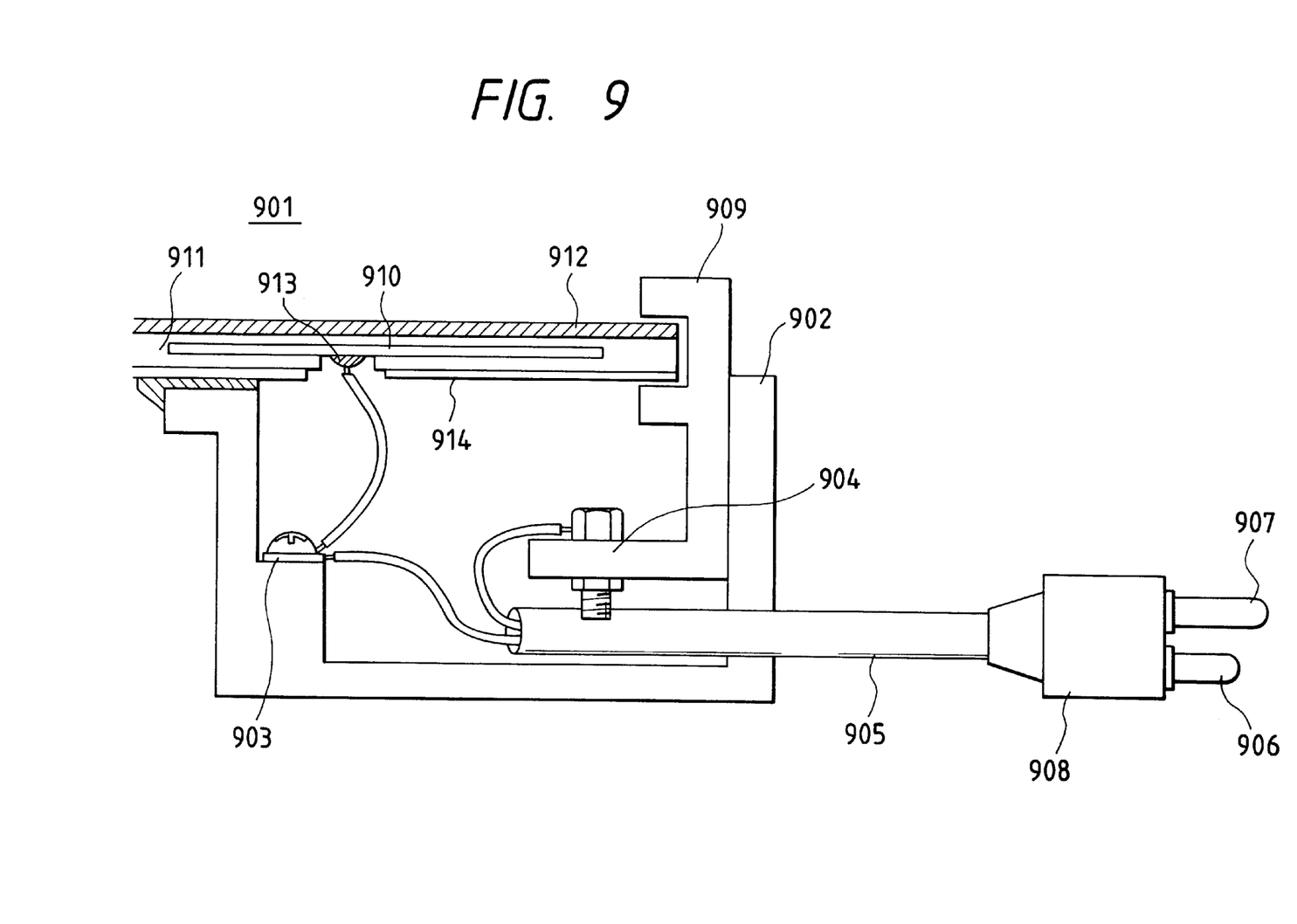
FIG. 9 is a schematic sectional view showing a preferred example of the connection relation between a solar cell module and a cable.

FIG. 9 is a schematic sectional view of a photovoltaic power generation apparatus constructed of the solar cell array using the crystalline solar cell modules the structure of which is substantially the same as in Example 2 except for the inside of the junction box. The solar cell module 901 is constructed in such structure that the solar cell elements 910 are sealed with a filler 911, glass 912 is provided in the front surface, and a back surface film 914 is provided in the back surface. The bottom film 914 and filler 911 are removed at the portion corresponding to an output terminal 913 of solar cell elements 910, so that the output terminal 913 may be electrically connected to the electric connection portion 903 provided inside the junction box 902. Further, the junction box 902 has a grounding portion 904 connected to a frame 909 inside. One of the cores of a two-core CV cable 905 is connected to the grounding portion 904, and the other core is connected to the electric connection portion 903. Attached to one end of the cable 905 is a connector 908 of polyvinyl chloride resin having a conduction electrode 906 and a grounding electrode 907, which are electrically connected to the electric connection portion 903 and to the grounding portion 904, respectively.

The connector 908 is coupled to another connector (not shown) adapted for engagement therewith, whereby the solar cell module is connected to the adjacent solar cell module. A solar-cell-integrated roof array can be formed by repetitively carrying out this operation. In the connector 908, the length of a tab of the grounding electrode 907 is relatively longer than that of the conduction electrode 906 in order to connect the grounding electrode 907, prior to the conduction electrode 906. Further, each solar cell array is connected inside the connection box in the same manner as in Example 3. Incidentally, an engagement error can be prevented by using the grounding electrode 907 and the conduction electrode 906 of different thicknesses.

The present example permits execution of connection of the grounding portion almost at the same time as connection of the conduction portion between the solar cell modules, which improves the operability. Further, since the grounding portion is located inside the junction box, the durability is also improved.

During a check at completion of the solar cell array or during maintenance or inspection thereof, the resistance is measured between the two electrodes of each solar cell array, whereby the grounding resistance of the solar cell modules can be checked readily.

Example 6

Figure 10:
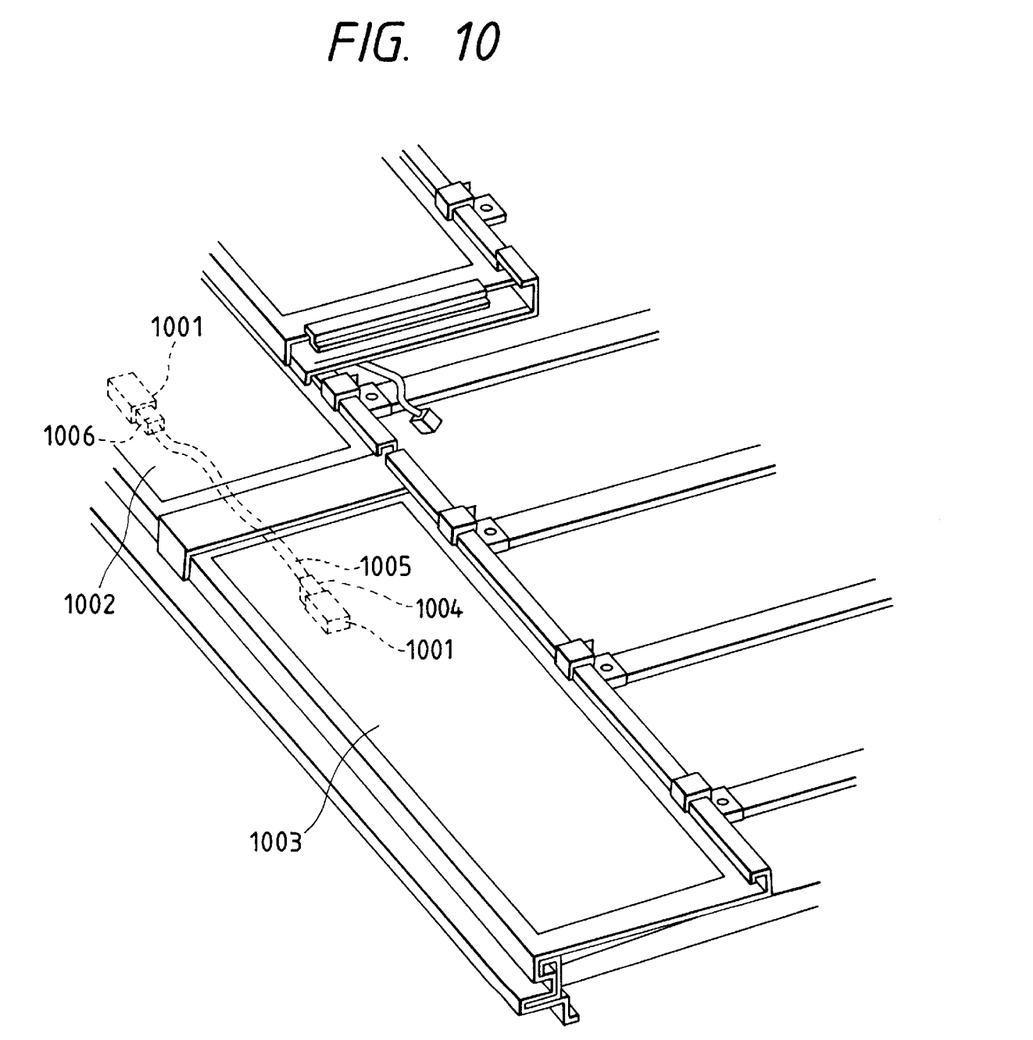
FIG. 10 is a schematic perspective view for explaining an example of a solar cell array installed on a roof.

FIG. 10 shows an example where the junction box 1001 attached to the back surface of the solar cell module in Example 4 has a connector structure. In the present example the solar cell modules 1002, 1003 are connected to each other by a double-terminal cable 1005 provided with connectors 1004, 1006 at the both ends thereof. This permits a plurality of solar cell modules to be connected readily, thereby composing a solar cell array. This example also permits execution of connection of the grounding portion almost at the same time as connection of the conduction portion between the solar cell modules, thereby improving the operability. Further, since the grounding portion is inside the junction box, the durability is also improved. During a check at completion of the solar cell array or during maintenance or inspection thereof, the resistance is measured between the two electrodes of each solar cell array, whereby the grounding resistance of the solar cell modules can be checked readily.

As detailed above, in the present invention, employing the electric wire having multiple cores eliminates the need for preparing a separate grounding conductor, which facilitates the works of installation and electric grounding of the apparatus and which improves the durability of the grounding conductor. Further, by providing the electric connection portion and the grounding portion inside the same member of the solar cell module, connection of the grounding portion can be effected almost at the same time as connection between the solar cell modules, which improves the operability. In addition, the durability is further improved by providing the grounding portion inside the junction box. Further, during a check at completion of the solar cell array or during maintenance or inspection thereof, the grounding resistance of the solar cell modules can be checked readily by measuring the resistance between the grounding portions of the both electrodes of the solar cell array.

What is claimed is:

1. A solar cell array comprising a plurality of solar cell modules each comprising a solar cell element and an electroconductive outer portion, the plurality of solar cell modules being electrically connected by an electric wire, wherein the electric wire has a plurality of cores, at least one of the cores being connected to an electric connection portion for leading the power of the solar cell elements out and at least one of the cores being electrically connected to and in conduction with a grounding portion.

2. The solar cell array according to claim 1, wherein the solar cell modules are building material-integrated solar cell modules.

3. A photovoltaic power generation apparatus having the solar cell array as set forth in claim 1 connected to an inverter for controlling the output of the solar cell array or to a connection box by the electric wire.

4. A photovoltaic power generation apparatus having the solar cell array as set forth in claim 1 linked through an inverter to a power generation system.

5. The solar cell array according to claim 1, wherein the electric wire is a cable.

6. The solar cell array according to claim 1, wherein the grounding portion is provided in the electroconductive outer portion.

7. The solar cell array according to claim 1, wherein the electroconductive outer portion is a back surface material disposed on a non-light receiving surface side of the solar cell modules.

8. The solar cell array according to claim 1, wherein the grounding portion is provided on a support member of the solar cell array.

9. The solar cell array according to claim 1, wherein the grounding portion is provided on at least one of a steel belt and an electroconductive underlayment laid below the solar cell array.

10. The solar cell array according to claim 1, wherein the connection is made through connectors.

11. The solar cell array according to claim 1, wherein the light-receiving surface side of each of the solar cell elements is coated with a resin.

12. The solar cell array according to claim 1, wherein a weather-resistant transparent film is provided as an outermost surface coating material on the light-receiving surface side of each of the solar cell modules.

13. The solar cell array according to claim 1, wherein the solar cell elements each comprise a non-crystalline silicon based semiconductor formed on a stainless steel substrate.

14. The solar cell array according to claim 1, wherein the solar cell modules have flexibility.

15. A method of constructing a photovoltaic power generation apparatus by connecting a plurality of solar cell modules, each comprising a solar cell element and an electroconductive outer portion, through an electric wire having a plurality of cores to compose a solar cell array, and by further connecting the solar cell array to a connection box or an inverter by the electric wire, the method comprising the step of connecting at least one of the cores to an electric connection portion for leading the power of the solar cell elements out and the step of electrically connecting at least one of the cores to a grounding portion so as to be in conduction with said grounding portion.

16. A solar cell module comprising a solar cell elements an electroconductive outer portion, an electric wire, and a member having arranged therein an electric connection portion for leading the power of the solar cell element out and a grounding portion, wherein the electric wire has a plurality of cores, at least one of the cores being connected to the electric connection portion and at least one of the cores being electrically connected to and in conduction with the grounding portion.

17. The solar cell module according to claim 16, wherein the member is a junction box.

18. The solar cell module according to claim 17, wherein the junction box has a connector portion.

19. The solar cell module according to claim 16, wherein the member is a connector.

20. The solar cell module according to claim 19, wherein the connector has a plurality of poles and wherein the grounding portion is connected to a corresponding grounding portion of the connector prior to connecting the electric connection portion.

21. The solar cell module according to claim 19, wherein the connector has a plurality of poles having a plurality of thicknesses.

22. A solar cell array composed by connecting a plurality of the solar cell modules as set forth in claim 16 by an electric wire having a plurality of cores.

23. A solar cell array composed by connecting a plurality of the solar cell modules as set forth in claim 16 through connectors.

24. The solar cell module according to claim 16, wherein the solar cell module is a building material or solar cell-integrated roofing material.

25. A photovoltaic power generation apparatus having the solar cell array as set forth in claim 23 connected to an inverter for controlling an output of the array or to a connection box.

26. The solar cell module according to claim 16, wherein the grounding portion is a screw hole portion or through hole portion provided in the electroconductive outer portion.

27. The solar cell module according to claim 16, wherein the grounding portion is provided on the electroconductive outer portion by either laser welding or resistance welding.

28. The solar cell module according to claim 16, wherein the grounding portion is connected to the electroconductive outer portion with an electroconductive adhesive.

29. The solar cell module according to claim 16, wherein the grounding portion has a male screw portion or a female screw portion.

30. The solar cell module according to claim 16, wherein the inside of the same member is filled with a filler.

31. The solar cell module according to claim 16, wherein the member is electrically conductive, is electrically connected to the electroconductive outer portion, and has a grounding portion.

32. The solar cell module according to claim 16, wherein the light-receiving surface side of the solar cell element is coated with a resin.

33. The solar cell module according to claim 16, wherein a weather-resistant transparent film is provided as an outermost surface coating material on the light-receiving surface side of the solar cell module.

34. The solar cell module according to claim 16, wherein the solar cell element comprises a non-crystalline silicon based material formed on a stainless steel substrate.

35. The solar cell module according to claim 16, wherein the solar cell module has flexibility.

36. A method of producing a solar cell module comprising a solar cell element, an electroconductive outer portion, and an electric wire, comprising the steps of:

providing a solar cell module comprising a solar cell element and an electroconductive outer portion;

arranging a junction box on the electroconductive outer portion so that the junction box embraces an electric connection portion for leading the power of the solar cell element out and a grounding portion;

connecting at least one of a plurality of cores of an electric wire to the electric connection portion; and making at least one of the plurality of cores of the electric wire electrically connected to and in conduction with the grounding portion.

37. The method according to claim 36, further comprising the step of connecting an electric wire having a plurality of cores to which a connector having a grounding electrode and a conduction electrode is connected, to the electric connection portion and to the grounding portion.

38. The method according to claim 36, further comprising the step of filling the junction box with a filler.

39. A method of constructing a solar cell array comprising the step of connecting a plurality of solar cell modules as set forth in claim 16 to each other by connecting the members thereof, thereby composing a solar cell array.

40. A method of inspecting a photovoltaic power generation apparatus comprising the step of measuring the resistance of the grounding portion between two electrodes of the solar cell array of the photovoltaic power generation apparatus as set forth in claim 3.

41. A method of inspecting a photovoltaic power generation apparatus comprising the step of measuring the resistance of the grounding portion between two electrodes of the solar cell array of the photovoltaic power generation apparatus as set forth in claim 25.

42. A solar cell module comprising a solar cell element, an electroconductive outer portion, and an electric wire with a plurality of cores having a module connector at an end portion thereof, at least one of the cores being connected to an electric connection portion for leading the power of the solar cell element out, at least one of the cores being electrically connected to and in conduction with a grounding portion, wherein the module connector has a plurality of poles each electrically connected to a corresponding one of the plurality of cores such that when the module connector is engaged with an outer connector, at least one of the plurality of poles of the module connector in conduction via a corresponding one of the plurality of cores with the grounding portion is connected to a corresponding one pole of the outer connector, and then the other of the plurality of poles of the module connector in conduction via a corresponding one of the plurality of cores with the electric connection portion is connected to a corresponding one pole of the outer connector.

43. A solar cell module comprising a solar cell element, an electroconductive outer portion, and an electric wire with a plurality of cores having a connector at an end portion thereof, at least one of the cores being connected to an electric connection portion for leading the power of the solar cell element out, at least one of the cores being electrically connected to and in conduction with a grounding portion, wherein the connector has a plurality of poles of different thicknesses.

* * * * *

UNITED STATES PATENT AND TRADEMARK OFFICE
CERTIFICATE OF CORRECTION

PATENT NO. : 6,093,884
DATED : July 25, 2000
INVENTOR(S) : FUMITAKA TOYOMURA ET AL.

It is certified that error appears in the above-identified patent and that said Letters Patent is hereby corrected as shown below:

COLUMN 11:

Line 65, "elements" should read --element,--.

COLUMN 12:

Line 48, "same" should be deleted.

Signed and Sealed this

First Day of May, 2001

Attest:

NICHOLAS P. GODICI

Attesting Officer       Acting Director of the United States Patent and Trademark Office